(12) United States Patent
Kai

(10) Patent No.: US 12,281,621 B2
(45) Date of Patent: Apr. 22, 2025

(54) METHOD FOR CONTROLLING A TURBOMACHINE COMPRISING AT LEAST ONE ELECTRIC MACHINE, AND ASSOCIATED CONTROL SYSTEM

(71) Applicant: SAFRAN, Paris (FR)

(72) Inventor: Jean-Marie Kai, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 18/559,218

(22) PCT Filed: May 4, 2022

(86) PCT No.: PCT/FR2022/050861
§ 371 (c)(1),
(2) Date: Nov. 6, 2023

(87) PCT Pub. No.: WO2022/234232
PCT Pub. Date: Nov. 10, 2022

(65) Prior Publication Data
US 2024/0229727 A1    Jul. 11, 2024

(30) Foreign Application Priority Data
May 6, 2021 (FR) .................... 2104799

(51) Int. Cl.
*F02C 9/56* (2006.01)
*F02C 3/113* (2006.01)

(52) U.S. Cl.
CPC ............... *F02C 9/56* (2013.01); *F02C 3/113* (2013.01); *F05D 2220/323* (2013.01); *F05D 2220/76* (2013.01); *F05D 2270/05* (2013.01)

(58) Field of Classification Search
CPC .... F02C 9/56; F02C 3/113; F02C 7/36; F02C 7/32; F05D 2220/76; F05D 2270/05; F05D 2270/053
See application file for complete search history.

(56) References Cited

U.S. PATENT DOCUMENTS

2020/0173300 A1    6/2020 Gemin
2022/0349341 A1*  11/2022 Kupratis ................... F02C 9/56

FOREIGN PATENT DOCUMENTS

| EP | 3412575 A1 | 12/2018 |
| FR | 3087491 A1 | 4/2020 |
| WO | 2016020618 A1 | 2/2016 |

OTHER PUBLICATIONS

Search Report and Written Opinion issued in International Application No. PCT/FR2022/050861, mailed Aug. 24, 2022.
(Continued)

*Primary Examiner* — Andrew H Nguyen
(74) *Attorney, Agent, or Firm* — Bookoff McAndrews, PLLC

(57) ABSTRACT

Method for controlling a turbomachine equipped with a gas generator, the turbomachine including at least one electric machine forming a device for the injection/take-off of power onto/from one of the low-pressure/high-pressure rotating shafts of the gas generator. Said method has steps included in a loop which include determining, for at least one shaft and according to a speed setpoint, of a variation dU in a power command; determining, for all of the electric machines as a whole and according to an injection/take-off setpoint, of a variation dPelec in a power injection/take-off command; and determining a command including components pertaining to fuel flow rate and to power injection/take-off for each electric machine, according to the variations dU dPelec, and according to the operational limits of the turbomachine.

9 Claims, 8 Drawing Sheets

(56) References Cited

OTHER PUBLICATIONS

Search Report issued in French Application No. 2104799, mailed on Nov. 26, 2021.

* cited by examiner

[Fig. 1]
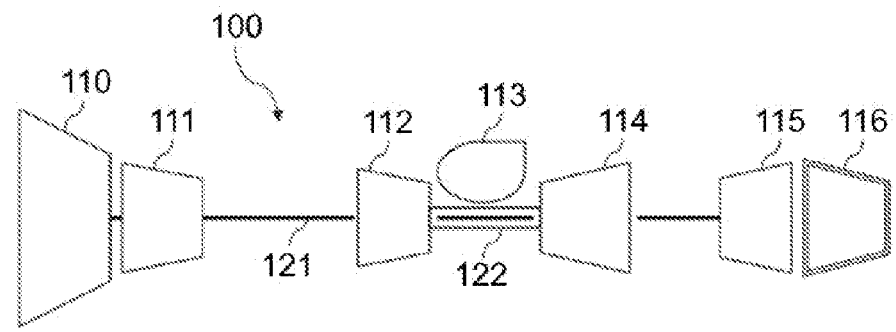
[Fig. 2]
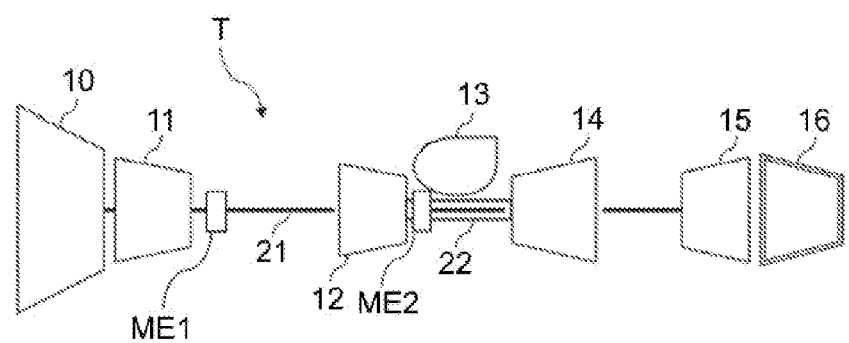
[Fig. 3]
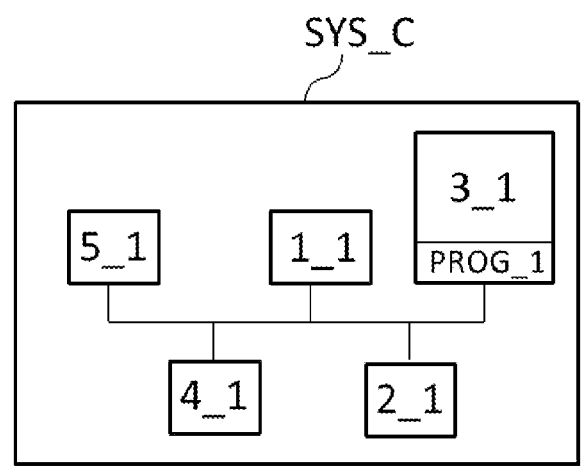

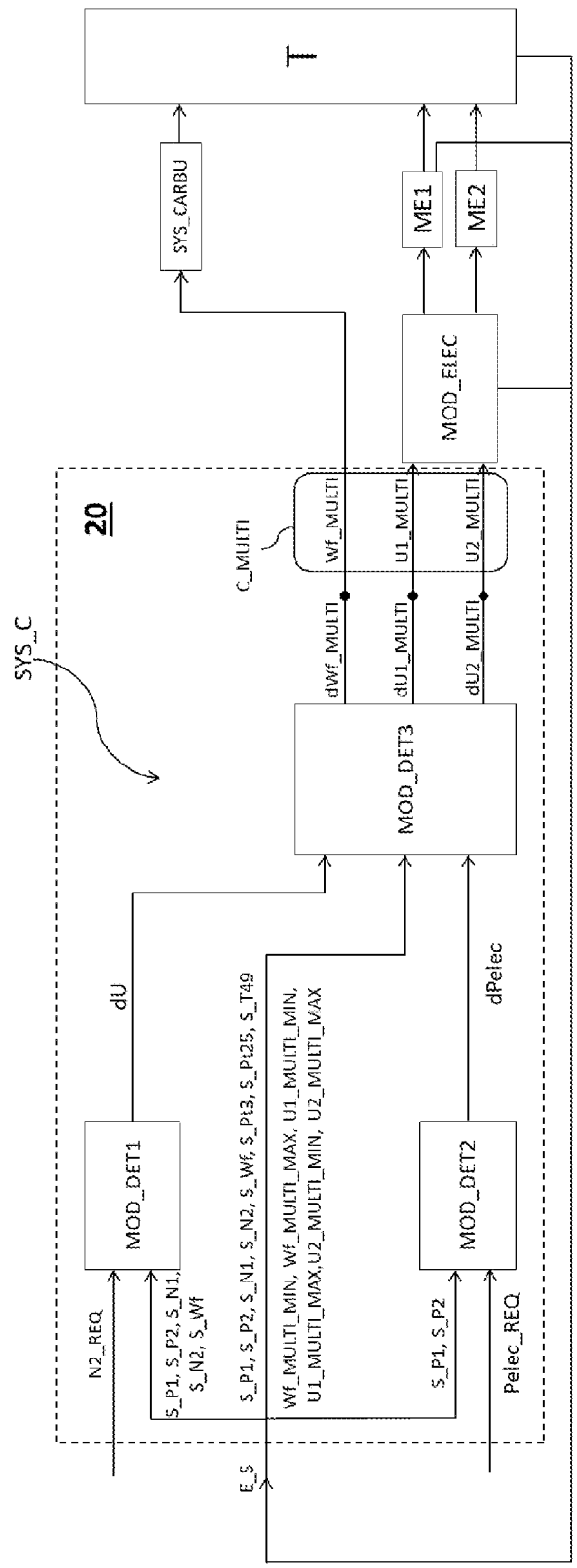
[Fig. 4]

[Fig. 5]
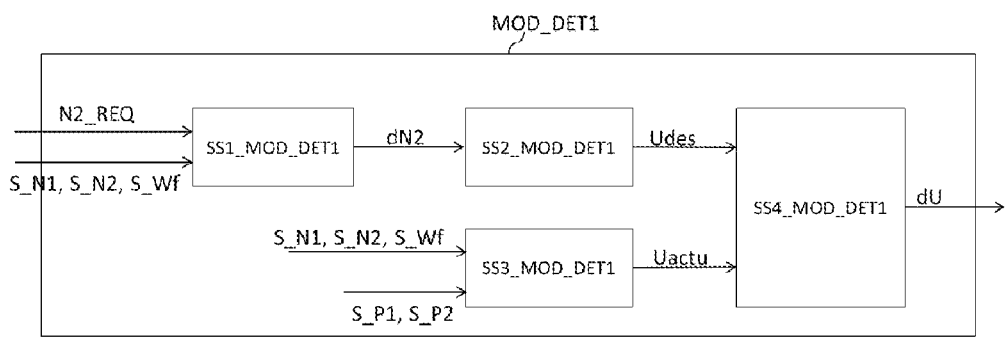
[Fig. 6]
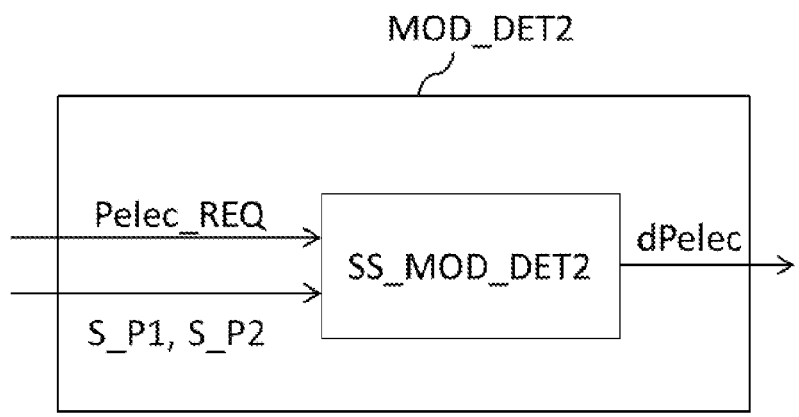

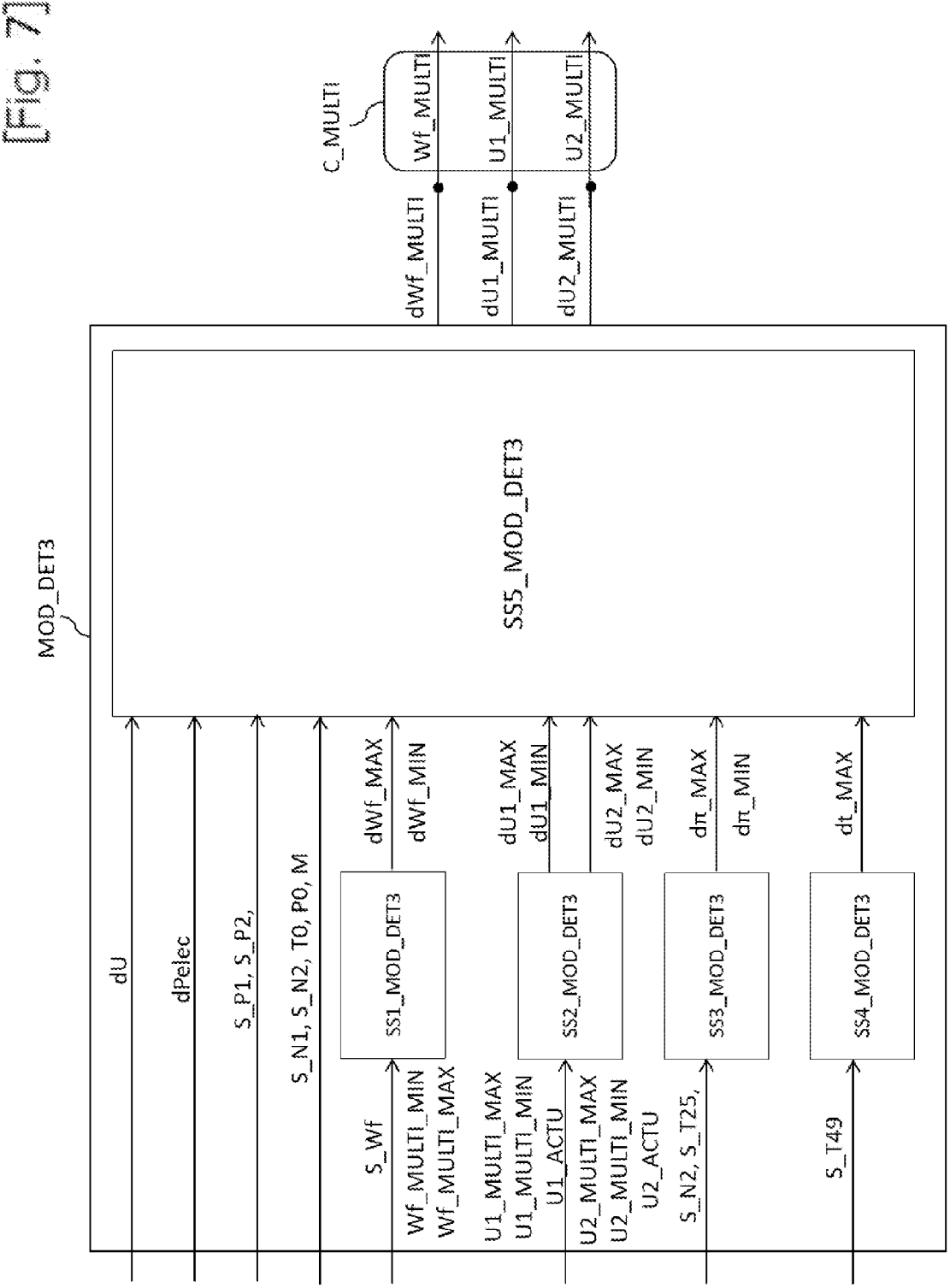
[Fig. 7]

[Fig. 8]
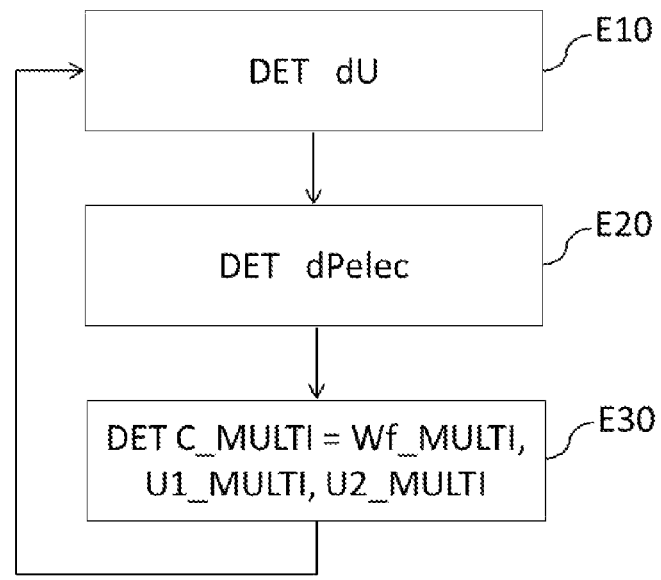
[Fig. 9]
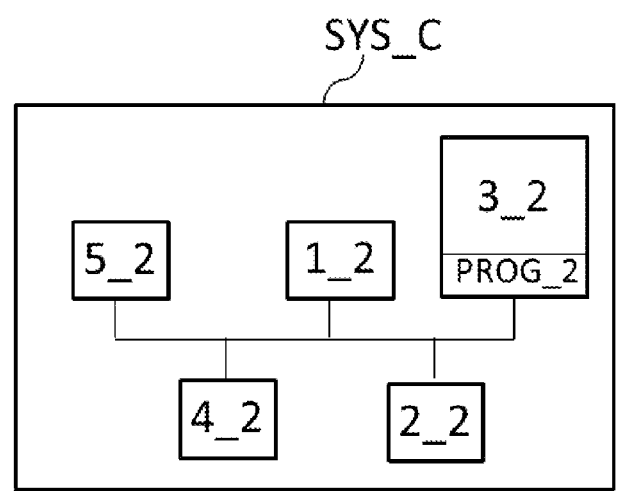

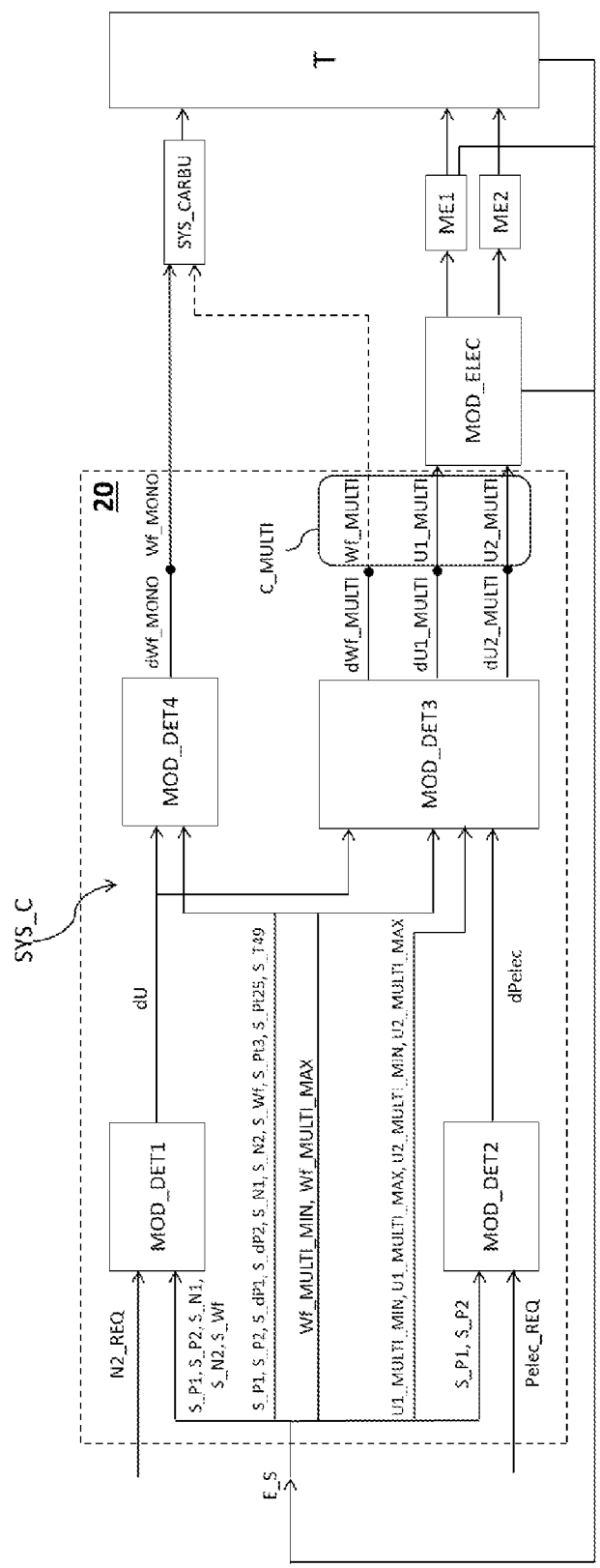
[Fig. 10]

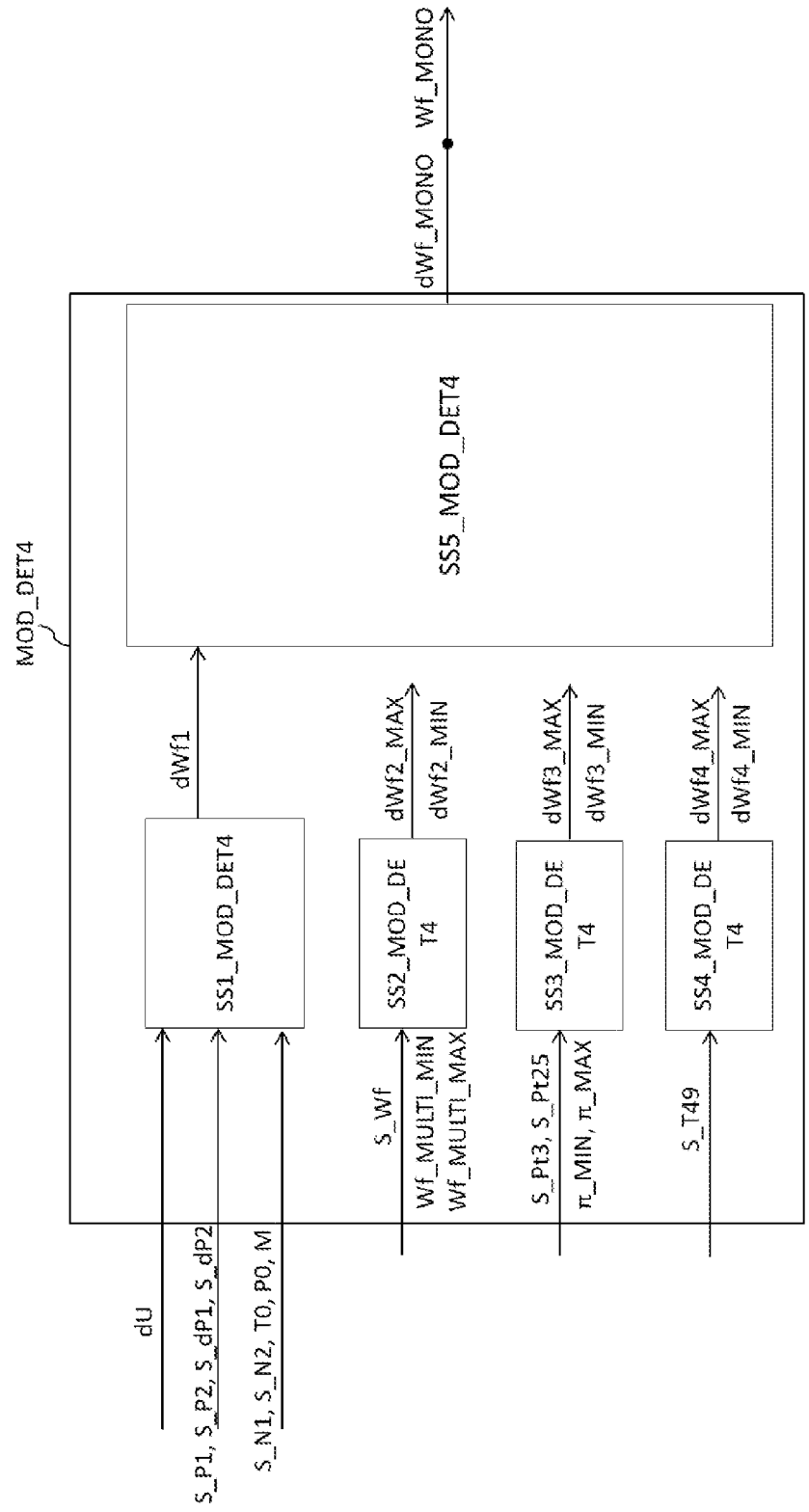

[Fig. 12]
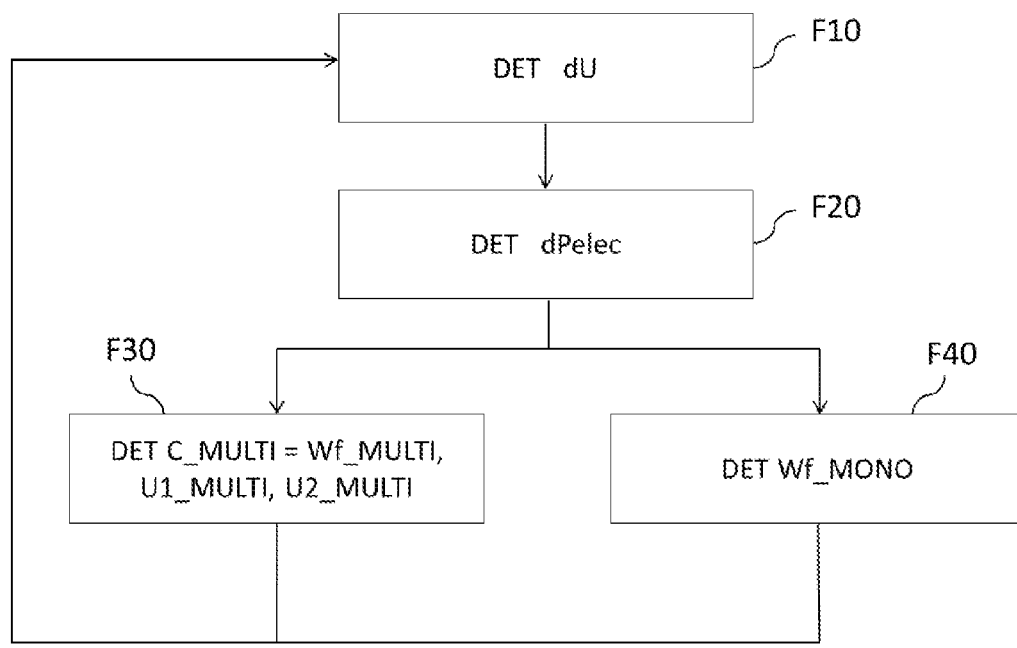

METHOD FOR CONTROLLING A TURBOMACHINE COMPRISING AT LEAST ONE ELECTRIC MACHINE, AND ASSOCIATED CONTROL SYSTEM

CROSS-REFERENCE TO RELATED APPLICATIONS

This is a National Stage Application under 35 U.S.C. § 371 of International Application No. PCT/FR2022/050861, filed May 4, 2022, now published as WO 2022/234232 A1, which claims priority to French Patent Application No. 2104799, filed on May 6, 2021.

PRIOR ART

This invention belongs to the general field of the control of the operation of turbomachines. It more specifically relates to a method for controlling a turbomachine equipped with a gas turbine and also including at least one electric machine forming a device for injecting/taking-off power onto/from a rotation shaft (low-pressure or high-pressure) of said gas generator. It also relates to a control system configured to implement said control method. Furthermore, the invention has a particularly advantageous, although in no way limiting, application in the field of aeronautics, more specifically in the context of the control of a turbomachine equipping an aircraft.

With reference to FIG. 1, a turbomachine 100 is schematically represented including a gas generator. More specifically, the example of FIG. 1 illustrates a turbomachine 100 of twin spool bypass turbojet engine for aircraft.

In a known manner, the turbomachine 100 comprises, from upstream to downstream in the direction of flow of the gas, a fan 110, a low-pressure compressor 111, a high-pressure compressor 112, a combustion chamber 113 that receives a fuel flow rate command Wf, a high-pressure turbine 114, a low-pressure turbine 115 and a primary exhaust nozzle 116. The low-pressure (or LP) compressor 111 and the low-pressure turbine 115 are connected by a low-pressure shaft 121 and together form a low-pressure body. The high-pressure (or HP) compressor 112 and the high-pressure turbine 114 are connected by a high-pressure shaft 122 and together form, with the combustion chamber, a high-pressure body. The fan 110, which is driven by the LP shaft 121, compresses the ingested air. This air is divided downstream of the fan 110 between a secondary air flow which is directed straight to a secondary nozzle (not shown) through which it is expelled to participate in the thrust provided by the turbomachine 100, and a so-called primary flow which enters into the gas generator, consisting of the low-pressure body and the high-pressure body, and which is then expelled into the primary nozzle 116.

Conventionally, the fuel flow rate command Wf is determined according to a difference between the current rating of the turbomachine and a setpoint which depends on a position of a control lever manipulated by the pilot. For this purpose, a fuel regulation loop is implemented by a control device, generally integrated into the electronic control unit of the FADEC (Full Authority Digital Engine Control), equipping the turbomachine.

The fuel regulation loop is therefore implemented such as to satisfy the engine rating requirements (i.e. the thrust/propulsion requirements), while guaranteeing the controllability and the operability of the turbomachine 100 via the observance of the operating limits of the turbomachine. These operating limits conventionally pertain to physical quantities relating to:

the considered control variables, so of necessity the fuel flow rate Wf injected into the combustion chamber, in both steady-state phases and transient phases (phase of acceleration or deceleration) alike, one or more variables of state of the turbomachine 100 (and which it is possible to access via measurements taken by means of sensors equipping the turbomachine). Such operating limits, also known as "operability limits", represent thresholds above which a malfunction of the engine may be encountered (e.g. surge phenomenon etc.) The observing of these operability limits helps to guarantee that the operating line of the turbomachine 100 is kept in an authorized operating region, so as not to exceed the limitations imposed by the physics of the components equipping the turbomachine 100.

Thus, the designer of a turbomachine must try to optimize the placement of the operating line by placing it as high as possible, so as to benefit from better performance for its compressors, while maintaining a sufficient distance (i.e. a margin) from the operability limits, so as to allow for safe accelerations/decelerations.

Thus, in the aim of improving the operation of a turbomachine during transient phases, while limiting the impact of the design limitations related to operability limits, provision has in particular been made for hybridizing the turbomachine 100 by equipping it with one or more electric machines (not shown in FIG. 1). Such electric machines are configured to inject and/or take power (or, equivalently, torque) off the rotation shafts. Note that improving the operation of a turbomachine, via said electric machines, also contributes to reducing the environmental footprint of the aircraft (i.e. the energy efficiency is improved).

The document WO2016/020618 describes an implementation in which one or more electric machines are used. That being said, this implementation remains imprecise as to the way in which the electric machines are controlled. In particular, no explicit and reproducible strategy is proposed for controlling the electric machines to optimize the operation and operability of the turbomachine.

In general, one searches for a generic strategy for controlling the operation of a hybridized turbomachine making it possible to take full advantage of the capabilities arising from hybridization, while minimizing the difficulties inherent to the exploitation thereof, namely:

the implementation of multivariable control (this is specifically a case of managing the fuel flow rate command but also the command of the electric machines), the coordinated management between hardware and/or software means dedicated to the control of the fuel flow rate on the one hand and those dedicated to the control of the electric machines on the other.

SUMMARY OF THE INVENTION

The aim of this invention is to remedy all or part of the drawbacks of the prior art, in particular those described above, by making provision for a solution that makes it possible to control a turbomachine equipped with a gas generator and comprising at least one electric machine more efficiently than the solutions of the prior art. The term "more efficient" here refers to a solution which has a moderate complexity of implementation and which makes it possible to exploit the control redundancy provided by one or more electric machines to optimally meet the propulsion requirements and the power injection/take-off requirements, such as to guarantee the controllability and also the operability of the turbomachine while observing the operating limits thereof.

For this purpose, and according to a first aspect, the invention relates to a method for controlling a turbomachine equipped with a gas generator comprising, respectively, low-pressure and high-pressure rotation shafts, the turbomachine including at least one electric machine forming a device for injecting/taking-off power onto/from one of said rotation shafts. Furthermore, said method includes steps included in a control loop and comprising:

the determining, for at least one shaft and as a function of a rating setpoint associated with said at least one shaft, of a variation dU of a mechanical power command, the determining, for the set of electric machines and as a function of an injection/take-off device associated with said set of electric machines, of a variation dPelec of a power injection/take-off command, the determining of a multivariable command including a fuel flow rate component as well as a power injection/take-off component for each electric machine, said multivariable command being determined such as to:
optimize a constraint of tracking of said variations dU and dPelec,
observe operating limits of the turbomachine.

Thus, according to the control method according to the invention, said variations dU and dPelec are first determined.

More specifically, the determination of the variation dU has the objective of fulfilling the propulsion requirement of the turbomachine. It is thus a question of control in terms of total mechanical power, for the shaft or shafts concerned at the time said variation dU is determined.

The determination of the variation dPelec, meanwhile, has the objective of fulfilling the requirement for power injection/take-off by the electric machine or electric machines. The power injection/take-off setpoint expresses an overall energy control requirement of the aircraft. This is therefore a setpoint of the total electrical power to be exchanged between the turbomachine and the electrical network of the aircraft, so as to provide the energy management of the turbomachine.

The control method according to the invention nonetheless differs from the prior art in that it makes provision for controlling the turbomachine by determining a command which makes a synthesis of the mechanical power requirements for the engine rating (variation dU) and also of the electrical power requirements for the operation of the electric machine or machines (variation dPelec), such as to ensure the overall energy management of the turbomachine.

Put still otherwise, unlike in the prior art, in which the variations dU and dPelec are managed separately to obtain control commands of the turbomachine, the control method according to the invention advantageously makes provision for relying on said variations dU and dPelec to determine an optimal multivariable command aiming to observe the tracking of these variations as well as the operating limits of the turbomachine. The multivariable command is therefore the solution of a constrained optimization problem.

This manner of proceeding (determining a multivariable command by optimization) is particularly advantageous in that it makes it possible to satisfy in a unified manner the propulsion requirements but also the power injection/take-off requirements, whether it is in a steady-state mode or in a transient mode, and within the operability limits of the turbomachine.

In particular modes of implementation, the control method may further include one or more of the following features, taken in isolation or in any technical possible combination.

In particular modes of implementation, the steps included in the control loop further include a step of determining a single-variable fuel flow rate command as a function of said variation dU, operating limits of the turbomachine and current injection/take-off values for said set of electric machines, the single fuel flow rate command intended to be executed for the control of the turbomachine, from among said single-variable command and the fuel flow rate component of the multivariable command, being said single-variable command.

Said single-variable command offers the possibility of computing, while observing operating limits of the turbomachine and independently of any coordination with control means specifically dedicated to the electric machine or machines, the variation in fuel flow rate needed to satisfy the control requirement in terms of propulsion, while taking into account (for example by pre-compensation) current (i.e. instantaneous) injection/take-off variations obtained from measurements taken on the turbomachine.

Furthermore, the single-variable command takes precedence (i.e. takes priority) over the fuel flow rate component of the multivariable command. Such arrangements make it possible to ensure a tolerance in the face of any faults on the electrical lines (uncontrolled power injection/take-off variations, electrical network unable to meet the requirements defined by the commands determined for the electric machines, delay in the application of said commands once they are transmitted to control means dedicated to said electric machines, etc.), or of poor coordination between the control of the fuel flow rate and the control of the electric machines.

In particular embodiments, the operating limits include:
a lower limit and an upper limit of a ratio of the pressures at the outlet and at the inlet of a high-pressure compressor belonging to the gas generator, such as to provide protection from surge and flameout phenomena, and/or
for at least one turbine belonging to the gas generator from among a low-pressure turbine and a high-pressure turbine, an upper temperature limit of said turbine.

In particular embodiments, the turbomachine includes a first electric machine forming a device for injecting/taking-off power onto/from the low-pressure rotation shaft and a second electric machine forming a device for injecting/taking-off power onto/from the high-pressure rotation shaft.

In particular modes of implementation, the constraint of tracking of the variations dU and dPelec is written:

$$\begin{bmatrix} a & b & c \\ 0 & d & e \end{bmatrix} \begin{bmatrix} dWf\_MULTI \\ dU1\_MULTI \\ dU2\_MULTI \end{bmatrix} = \begin{bmatrix} dU \\ dPelec \end{bmatrix} + \begin{bmatrix} v1 \\ v2 \end{bmatrix}$$

where:
a, b, c, d and e are given coefficients,
dWf_MULTI, dU1_MULTI and dU2_MULTI respectively correspond to bounded variations of the fuel flow rate component, of the power injection/take-off component for the first electric machine and of the power injection/take-off component for the second electric machine, the matrix V, of which the components v1 and v2 are given, corresponds to a regularization parameter used to relax the constraint of tracking of the variations dU and dPelec, and in which the optimization of the tracking constraint consists in minimizing a cost function J having the expression:

$$J = \begin{bmatrix} dWf\_MULTI \\ dU1\_MULTI \\ dU2\_MULTI \end{bmatrix}^T \times Q1 \times \begin{bmatrix} dWf\_MULTI \\ dU1\_MULTI \\ dU2\_MULTI \end{bmatrix} + \begin{bmatrix} v1 \\ v2 \end{bmatrix}^T \times Q2 \times \begin{bmatrix} v1 \\ v2 \end{bmatrix}$$

where Q1 and Q2 are given weight matrices.

The matrix V, of which the components v1 and v2 are given, makes it possible to deviate from the control objectives when their attainment is no longer possible under the constraint of tracking of the variations dU and dPelec, while also observing the operating limits of the turbomachine.

The matrix Q1 is a weight matrix which makes it possible to minimize the variations of the control variables, and which can for example be chosen such as to prefer the use of one control variable over another in the context of the control of the turbomachine.

The matrix Q2, meanwhile, is a weight matrix which makes it possible to minimize the deviation with respect to the control objectives, and which can for example be chosen such as to prefer one control objective with respect to another. By way of example without any limitation whatsoever, the matrix Q2 can be chosen such that the regulation of the engine rating is preferred during transient phases with regard to electrical injections/take-offs.

In particular modes of implementation, said at least one shaft considered when determining the variation dU is the low-pressure rotation shaft if the control loop is implemented during a steady-state operating phase of the turbomachine, and the high-pressure rotation shaft if the control loop is implemented during a transient operating phase of the turbomachine.

According to another aspect, the invention relates to a computer program including instructions for implementing a control method according to the invention when said computer program is executed by a computer.

This program can use any programming language, and be in the form of source code, object code, or intermediate code between source code and object code, such as in a partially compiled form, or in any other desirable form.

According to another aspect, the invention relates to an information or storage medium readable by a computer and on which is recorded a computer program according to the invention.

The information or recording medium can be any entity or device capable of storing the program. For example, the medium can include a storage means, such as a ROM, for example CD ROM or a microelectronic circuit ROM, or else a magnetic recording means, for example a diskette (floppy disk) or a hard disk.

Moreover, the information or recording medium can be a transmissible medium such as an electrical or optical signal, which can be conveyed via an electrical or optical cable, by radio or by other means. The program according to the invention can in particular be downloaded over an Internet-type network.

Alternatively, the information or recording medium can be an integrated circuit into which the program is incorporated, the circuit being suitable for executing or for being used in the execution of the method in question.

According to another aspect, the invention relates to a system for controlling a turbomachine equipped with a gas generator comprising, respectively, low-pressure and high-pressure rotation shafts, the turbomachine including at least one electric machine forming a device for injecting/taking-off power onto/from one of said rotation shafts, said control system including:

a first determining module configured to determine, for at least one shaft and as a function of a rating setpoint associated with said at least one shaft, a variation dU of a mechanical power command, a second determining module configured to determine, for the set of electric machines and as a function of an injection/take-off setpoint associated with said set of electric machines, a variation dPelec of a power injection/take-off command, a third determining module configured to determine a multivariable command including a including a fuel flow rate component as well as a power injection/take-off component for each electric machine, said multivariable command being determined such as to:

optimize a constraint of tracking of the variations dU and dPelec, observe operating limits of the turbomachine.

In particular embodiments, said control system further includes a fourth determining module configured to determine a single-variable fuel flow rate command as a function of said variation dU, operating limits of the turbomachine and injection/take-off values for said set of electric machines, the single fuel flow rate command intended to be executed for the control of the turbomachine, from among said single-variable command and the fuel flow rate component of the multivariable command, being said single-variable command.

According to another aspect, the invention relates to a turbomachine equipped with a gas generator including, respectively, low-pressure and high-pressure rotation shafts, the turbomachine comprising at least one electric machine forming a device for injecting/taking-off power onto/from at least one of said rotation shafts as well as a control system according to the invention.

According to another aspect, the invention relates to an aircraft including a turbomachine according to the invention.

BRIEF DESCRIPTION OF THE DRAWINGS

Other features and advantages of this invention will become apparent from the description given below, with reference to the appended drawings which illustrate an exemplary embodiment thereof without any limitation. In the figures:

FIG. 1 schematically represents a turbomachine including a gas generator in accordance with the prior art;

FIG. 2 schematically represents, in its environment, an embodiment of a turbomachine according to the invention;

FIG. 3 shows a first example of a hardware architecture of a control system belonging to the turbomachine of FIG. 2;

FIG. 4 schematically represents a particular example of operation of a control loop of the turbomachine of FIG. 2, as implemented by means, in particular, of the control system of FIG. 3;

FIG. 5 schematically represents a particular exemplary embodiment of a first determining module belonging to the control system used for the operation of the control loop of FIG. 4;

FIG. 6 schematically represents a particular exemplary embodiment of a second determining module belonging to the control system used for the operation of the control loop of FIG. 4;

FIG. 7 schematically represents a particular exemplary embodiment of a third determining module belonging to the control system used for the operation of the control loop of FIG. 4;

FIG. 8 shows, in the form of a flow chart, a particular mode of the control method according to the invention, implemented by the control system FIG. 3;

FIG. 9 schematically represents a second example of a hardware architecture of the control system belonging to the turbomachine of FIG. 2;

FIG. 10 schematically represents another particular example of operation of the control loop of the turbomachine of FIG. 2, as implemented by means, in particular, of the control system of FIG. 9;

FIG. 11 schematically represents a particular exemplary embodiment of a fourth determining module belonging to the control system used for the operation of the control loop of FIG. 10;

FIG. 12 shows, in the form of a flow chart, a particular embodiment of the control method according to the invention, implemented by the control system of FIG. 9.

DESCRIPTION OF THE EMBODIMENTS

This invention belongs to the field of control (i.e. regulation) of the operation of a turbomachine including a gas generator.

The remainder of the description will consider without any limitation whatsoever the case of a turbomachine of twin-spool bypass turbojet engine type for aircraft, such as for example a civil airplane able to carry passengers. It should however be noted that the invention remains applicable whatever the type of the turbomachine under consideration, as long as the latter includes a gas generator. For example, it is possible to envision a turboshaft engine, a turbofan engine, etc.

Furthermore, the invention also remains applicable for any type of aircraft (airplane, helicopter etc.), but also, more broadly, for any type of industrial machine equipped with a turbomachine according to the invention.

FIG. 2 schematically represents, in its environment, an embodiment of a turbomachine T according to the invention.

The turbomachine T allows for a general structural configuration at least in accordance with the prior art. By way of example without any limitation whatsoever, such a general configuration has been described above with reference to FIG. 1.

Thus, the turbomachine T comprises, from upstream to downstream in the direction of flow of the gas, a fan 10, a low-pressure compressor 11, a high-pressure compressor 12, a combustion chamber 13 which receives a fuel flow rate command, a high-pressure turbine 14, a low-pressure turbine 15 and an exhaust nozzle 16. The low-pressure (or LP) compressor 11 and the low-pressure turbine 15 are connected by a low-pressure shaft 21 and together form a low-pressure body. The high-pressure (or HP) compressor 12 and the high-pressure turbine 14 are connected by a high-pressure shaft 22 and together form, with the combustion chamber 13, a high-pressure body. The fan 10, which is driven by the LP shaft 21, compresses the ingested air. This air is divided downstream of the fan 10 between a secondary air flow which is directed straight to a secondary nozzle (not shown) through which it is expelled to participate in the thrust provided by the turbomachine T, and a so-called primary flow which enters into the gas generator, consisting of the low-pressure body and the high-pressure body, and which is then expelled into the primary nozzle 16.

In a known manner, the operation of the turbomachine T is controlled by a full-authority engine control device, the so-called FADEC 20.

In this embodiment, and as illustrated by FIG. 2, the turbomachine T also includes two electric machines, a first electric machine ME1 and a second electric machine ME2. Conventionally, each electric machine ME1, ME2 forms a device for injecting/taking-off power onto/from one of said rotation shafts 21, 22. More specifically, it is considered here that the first electric machine ME1 (or the second electric machine ME2) is associated with the LP shaft 21 (or the HP shaft 22 respectively). The power injected/taken off by each electric machine ME1, ME2 off the shaft 21, 22 with which it interacts is generated by said electric machine ME1, ME2 on receiving a power command, as will also be described further on.

It is important to note that the invention is not limited to the case where two electric machines are used to inject/take power off the two LP 21 and HP 22 shafts. Thus, nothing prevents, for example, the envisioning of other embodiments in which a single electric machine is used, this single electric machine being able to interact interchangeably with the LP shaft 21 exclusively or else with the HP shaft 22 exclusively.

Conventionally, each electric machine ME1, ME2 can be configured according to a first operating mode, such as to generate a power suitable for driving the shaft that is associated therewith. Such a first mode of operation is conventionally referred to as "motor operating mode". Each electric machine ME1, ME2 can also be configured according to a second operating mode, such as to generate a power suitable for taking-off mechanical energy from the shaft that is associated therewith, this take-off energy being able to be used, for example, for the purposes of powering non-propulsive systems such as for example the air conditioning or de-icing system of the turbomachine T, or else the charging of batteries. Such a second operating mode is conventionally referred to as a "generator operating mode".

Those skilled in the art may for example refer to the document WO2016/020618 as regards the general principles of embodiment and implementation of an electric machine for a turbomachine, so these aspects will not be further described here.

It should be noted that each electric machine can also be seen as a device for injecting/taking-off mechanical torque from the shaft with which it interacts. This is because it is perfectly equivalent to consider an injection/take-off of a shaft in terms of either power or torque, these two physical quantities being related to one another via the rotation speed of the shaft in question, as is well-known to those skilled in the art. Also, without this giving rise to any confusion, the sole physical quantity considered henceforth in the remainder of the description relating to these aspects will be power.

In accordance with the invention, the turbomachine T also includes a control system SYS_C configured to carry out processing making it possible to control, in a coordinated manner, the fuel flow rate in the combustion chamber 13 and the powers injected/taken off by the electric machines ME1, ME2, implementing a control method according to the invention, described in detail below, and the steps of which are included in a control loop of the turbomachine T.

In this embodiment, said control system SYS_C is integrated into the FADEC 20, more specifically into the electronic control unit of the latter. No limitation is however attached to the location of said control system SYS_C within the turbomachine T as long as the latter is able to implement the control method according to the invention, and thus make it possible to control the turbomachine T in a particularly effective way.

FIG. 3 schematically represents a first example of a hardware architecture of the control system SYS_C belonging to the turbomachine of FIG. 2.

As illustrated by FIG. 3, the control system SYS_C according to the invention possesses the hardware architecture of a computer. Thus, said control system SYS_C includes, in particular, a processor 1_1, a random-access memory 2_1, a read-only memory 3_1 and a non-volatile memory 4_1. It moreover possesses communication devices 5_1.

The read-only memory 3_1 of the control system SYS_C constitutes a recording medium in accordance with the invention, readable by the processor and on which is recorded a computer program PROG_1 in accordance with the invention, including instructions for executing the steps of the control method according to the invention. The program PROG_1 defines functional modules of the control system SYS_C, which rely on or control hardware elements 2_1 to 5_1 of said control system SYS_C mentioned previously, and which particularly comprise:

- a first determining module MOD_DET1 configured to determine, for at least one shaft 21, 22 and as a function of a rating setpoint N1_REQ, N2_REQ associated with said at least one shaft 21, 22, a variation dU of a mechanical power command U (the variation dU, and therefore of necessity the corresponding command U, is therefore generated to meet the propulsion requirements to track a desired rating; the command U can therefore be described as a "total" mechanical power command),
- a second determining module MOD_DET2 configured to determine, for the two electric machines M1, M2 and as a function of an injection/take-off setpoint Pelec_REQ associated with said two electric machines M1, M2, a variation dPelec of a power injection/take-off command Pelec,
- a third determining module MOD_DET3 configured to determine a multivariable command C_MULTI including a fuel flow rate component Wf_MULTI as well as a power injection/take-off component UL1_MULTI, U2_MULTI for each electric machine M1, M2, said multivariable command C_MULTI being determined such as to:
  optimize a constraint of tracking of said variations dU and dPelec,
  observe operating limits of the turbomachine T.

The way in which the different variations dU and dPelec, along with the different commands Wf_MULTI, UL1_MULTI, U2_MULTI are determined by the first, second and third modules MOD_DET1, MOD_DET2, MOD_DET3 will be subsequently detailed through several modes of implementation of the control procedure according to the invention.

In accordance with the invention, note that the term "variation" refers to a differential over time of the variable concerned by said variation. The way in which a command can be determined based on the variation which has been determined for it is well-known to those skilled in the art. In short, it is recalled that such a determination of a command can be done using means configured in hardware and/or software to perform an integration over time of the variation associated with said command. For example, and purely as an illustration, if U_OLD corresponds to the total power command determined during the preceding iteration of the control loop, the new command U is equal to U_OLD+dU× dt, where dt is equivalent to the temporal discretization increment with which the control loop is iterated (said discretization increment being in line with the computing frequency of the FADEC 20; for example said computational frequency is between 50 Hz and 100 Hz, such that the discretization increment varies between 10 ms and 20 ms).

The determination of the variation dU has the objective of fulfilling the propulsion requirement of the turbomachine T. Here it is therefore a question of control in terms of total mechanical power, for the shaft or shafts concerned at the time said variation dU is determined.

The determination of the variation dPelec, meanwhile, has the objective of fulfilling the requirement for power injection/take-off by the electric machine or machines. The injection/take-off setpoint expresses a requirement of the overall energy control of the aircraft. This is therefore a setpoint of a total electrical power to be exchanged between the turbomachine T and the electrical network of the aircraft, so as to ensure the energy management of the turbomachine T.

The communication means 5_1 in particular allow the control system SYS_C to issue fuel flow rate commands Wf_MULTI and power injection/take-off commands U1_MULTI, U2_MULTI to, respectively, the fuel system SYS_CARBU of the turbomachine T (said fuel system is used to control the fuel flow rate in the combustion chamber 13 and the electric machines ME1, ME2. Consequently, said fuel system SYS_CARBU along with each of said electric machines ME1, ME2 are respectively equipped with communication means configured to receive the commands addressed to them. The communication means 5_1 also allow the control system SYS_C to receive a set E_S of signals obtained based on measurements taken on the turbomachine T, these measurements being acquired by acquiring means (not shown in the figures) equipping the latter. The communication means 5_1 for example include a computer data bus suitable for transmitting said commands as well as said measurements. According to another example, the communication means 5_1 include a communication interface, wired or wireless, suitable for implementing any suitable protocol known to those skilled in the art (Ethernet, Wi-Fi, Bluetooth, 3G, 4G, 5G, etc.).

Conventionally, said measurements correspond to measurements of physical quantities which pertain, in particular, to the control variables under consideration, i.e. here the fuel flow rate and the powers injected/taken off by each of the electric machines ME1, ME2. Besides pertaining to the control variables under consideration, said measurements can also pertain to variables of state of the turbomachine T, such as for example one or more pressures at the inlet and/or outlet and/or within the components of the turbomachine T, one or more shaft rotation ratings, the speed of the aircraft, one or more temperatures at the inlet and/or outlet and/or within components of the turbomachine T, etc. In general, no limitation is attached to the variables of state that can undergo measurement in the context of this invention, those skilled in the art being able to determine the measurements that should be taken for the control method according to the invention to be executed.

The acquisition means configured to acquire said measurements include, in a known manner, an acquisition line comprising a sensor dedicated to the measurement of said quantities. Each of these sensors forms a sensitive element configured to provide an analog electrical signal as a function of the variations in the physical quantity with which it is associated. Said acquisition line for example includes an acquisition card configured to condition the electrical signal provided by a sensor, for example by amplification and/or filtering. Said acquisition means also include, at the output of the acquisition line, an analog/digital converter configured to digitize a conditioned electrical signal. In general, the configuration of such acquisition means is well-known to those skilled in the art and will consequently not be further detailed here.

The operating limits of the turbomachine T pertain, in particular, to the control variables under consideration. In other words, in accordance with this invention, said operating limits are, in particular, limits applied to the different components of the multivariable command C_MULTI (i.e. to the control variables under consideration). In practice, such operating limits correspond, for each component of the multivariable command C_MULTI, to a given lower limit and upper limit. For the remainder of the description, these lower and upper limits will be respectively denoted:
  Wf_MULTI_MIN and Wf_MULTI_MAX for the component Wf_MULTI,
  U1_MULTI_MIN and U1_MULTI_MAX for the component U1_MULTI,
  U2_MULTI_MIN and U2_MULTI_MAX for the component U2_MULTI.

Such lower and upper limits make it possible not to take into account any saturations of the different components of the multivariable command C_MULTI. Furthermore, and as will be detailed further on, lower and upper limits are also associated with the variations of said components and make it possible to take into account limitations on their respective bandwidths.

Conventionally, said set E_S of signals includes, for the control of the turbomachine T and with regard to the components of the multivariable command C_MULTI:
  a power signal S_P1 (or a power signal S_P2) injected/taken off the LP shaft 21 (or off the HP shaft 22 respectively). Note that such signals S_P1, S_P2 refer to an instantaneous power injected/taken off a shaft,
  a rating signal S_N1 (or S_N2) of the LP shaft 21 (or of the HP shaft 22 respectively),
  a signal S_Wf of the fuel flow rate in the combustion chamber 13.

Of course, in correlation with what has been detailed above relating to the physical quantities able to undergo measurement, other operating limits, in addition to those pertaining to said control variables, may be envisioned. Such other operating limits typically correspond to operability limits which are defined based on one or more variables of state of the turbomachine T. For this purpose, the set E_S of signals can further include other signals than said signals S_P1, S_P2, S_N1, S_N2 and S_Wf, these other signals being relative to said variables of state necessary to the definition (i.e. to the computation) of said operability steps.

According to an exemplary embodiment, the operating limits include, in addition to those pertaining to said control variables, a lower limit $\pi\_MIN$ and an upper limit $\pi\_MAX$ of a ratio $\pi$ of the outlet and inlet pressures of the HP compressor 12, such as to provide protection from surge and flameout phenomena. Note that said outlet and inlet pressures are also known by the names "Pt3" and "Pt25" in the field of turbomachine control.

Note that, as an alternative, the protection from surge and flameout phenomena can also be provided by implementing, not lower and upper limits pertaining to the ratio Pt3/Pt25, but lower and upper limits of a ratio of the fuel flow rate signal S_Wf and a variable of state corresponding to the static pressure measured at the outlet of the combustion chamber 13, also known by the name "Ps3" in the field of turbomachine control. These aspects are well-known to those skilled in the art so will not be further detailed here.

According to another exemplary embodiment, or else in addition to the preceding example relating to protection from surge and flameout phenomena, the operating limits include, in addition to those pertaining to said control variables, and for each of said HP 14 and LP 15 turbines, an upper temperature limit of the turbine under consideration. In the field of turbomachine control, the temperatures in question are also known by the name "T49" and "T50" as regards the HP 14 and LP 15 turbines respectively.

Of course nothing prevents the envisioning of yet other examples of operating limits, taken in isolation or else in combination, as operability limits. For example, operability limits corresponding to an acceleration limit of C/P type and/or to a limit relating to a mechanical ratio N1 and/or to a limit relating to a mechanical ratio N2, etc. can be envisioned. In general, no limitation is attached to the number of operability limits which can be considered in this invention.

Furthermore, it is important to note that the invention is not restricted to the case where the signals of the set E_S result directly from measurements taken on the turbomachine T. Specifically, the expression "signals obtained" also covers the case where signals from among said set E_S correspond to synthesis signals, i.e. signals which are not directly provided by the acquiring means, but estimated, based on the acquired signals, using a model (generally non-linear) of the operation of the turbomachine T. By way of example without any limitation whatsoever, a synthesis signal is a signal relating to a variable of state which is not directly measurable by a sensor, or else a more complex signal such as a remaining surge margin signal. These aspects being well-known to those skilled in the art, they will not be further described here.

For the remainder of the description, and for the purpose of its simplification, it will be henceforth be considered without any limitation whatsoever that the only operability limits taken into account are said lower $\pi\_MIN$ and upper $\pi\_MAX$ limits mentioned above and which make it possible to provide protection from surge and flameout phenomena, as well as an upper limit t_MAX associated with the temperature at the HP turbine 14.

Consequently, it is also considered for the remainder of the description that the set E_S of signals comprises, in this example, the signals S_P1, S_P2, S_N1, S_N2 and S_Wf associated with the control variables, but also signals S_Pt3, S_Pt25 and S_T49 respectively associated with the quantities Pt3, Pt25 and T49 described above.

As mentioned above, the total power variation dU is determined by the first determining module MOD_DET1 for at least one shaft 21, 22. The number of shafts concerned by said variation dU can for example depend on the flight phase in which the aircraft is found, at the time said variation dU is determined.

Thus, according to an exemplary embodiment, said at least one shaft considered when determining the variation dU is:

the LP rotation shaft 21 if the control loop is implemented during a steady-state operating phase of the turbomachine T, and the HP rotation shaft 22 if the control loop is implemented during a transient operation phase of the turbomachine T.

For this purpose, the first determining module MOD_DET1 for example comprises a first sub-module dedicated to the LP shaft 21 and configured to determine the variation dU during a steady-state operating phase, as well as a second sub-module dedicated to the HP shaft 22 to determine the variation dU during a transient operating phase.

Of course, nothing prevents the envisioning of a reverse example of the preceding example, in which the LP rotation shaft 21 (or HP high-pressure rotation shaft 22) is considered during a transient operating phase (or a steady-state operating phase respectively).

It is also important to note that the fact of considering that the variation dU is determined for a single shaft during a given phase (steady-state or transient) of the turbomachine T constitutes only one variant embodiment of the invention. Other variant embodiments can be envisioned, such as for example a determination of the variation dU such that the latter includes, during each phase of operation of the turbomachine T, a first component associated with the LP shaft 21 and a second component associated with the HP shaft 22 (thus, in this example, the first determining module MOD_DET1 can include four sub-modules, namely two sub-modules dedicated to the LP shaft 21 for the steady-state and transient phases respectively, and two sub-modules dedicated to the HP shaft 22 for the steady-state and transient phases respectively).

For the remainder of the description, and for the purpose of its simplification, it will also henceforth be considered that the variation dU is determined for a single shaft during a given phase (steady-state or transient) of the turbomachine T, in accordance with the example described above.

There will now follow a description of a particular example of operation of the control loop of the turbomachine T, as implemented by means, in particular, of the control system SYS_C of FIG. 3. The description of this operating example is given schematically with reference to the block diagram of FIG. 4.

For this operating example illustrated by FIG. 4, it is considered without any limitation whatsoever that the turbomachine T is in a transient operating phase, such that, in accordance with the provisions henceforth taken into account, the variation dU is determined for the HP shaft 22.

As illustrated by FIG. 4, from among the signals of the set E_S, the signals S_P1, S_P2, S_N1, S_N2 and S_Wf are conveyed as input to the first determining module MOD_DET1. Said first module MOD_DET1 also allows as input the rating setpoint N2_REQ associated with the HP shaft 22. Based on these signals and on this setpoint received as input, the first determining module MOD_DET1 is able to determine the variation dU.

The signals S_P1 and S_P2 are also conveyed as input to the second determining module MOD_DET2. Said second module MOD_DET2 also allows as input the injection/take-off setpoint Pelec_REQ. Based on these signals and on this setpoint received as input, the second determining module MOD_DET2 is able to determine the variation dPelec.

As also illustrated by FIG. 4, the third determining module MOD_DET3 receives as input, in particular, the variations dU and dPelec, the signals S_P1, S_P2, S_N1, S_N2, S_Wf, S_Pt3, S_Pt25 and S_T49, and the limits Wf_MULTI_MIN, Wf_MULTI_MAX, U1_MULTI_MIN, U1_MULTI_MAX, U2_MULTI_MIN, U2_MULTI_MAX. Based on these signals and limits received as input, the third determining module MOD_DET3 is able to determine the components Wf_MULTI, UL1_MULTI and U2_MULTI of the command C_MULTI (more specifically, variations dWf_MULTI, dU1_MULTI and dU2_MULTI are first determined, such that the components Wf_MULTI, U1_MULTI and U2_MULTI are obtained by integration of these variations).

Note that yet more inputs can be provided to the third determining module MOD_DET3, these aspects being more specifically detailed below, in a particular exemplary embodiment of said determining module MOD_DET3 (FIG. 7).

The component Wf_MULTI is then conveyed to the fuel system SYS_CARBU of the turbomachine T, such that the fuel flow rate injected into the combustion chamber 13 is in accordance with said component Wf_MULTI.

The components UL1_MULTI and U2_MULTI, meanwhile, are conveyed to a control module MOD_ELEC specifically dedicated to the control of said electric machines M1, M2, such that they can then inject/take the required power off each shaft.

Note that the figure also shows a block bearing the letter "T", the presence of this block aiming to symbolize the fact that the execution of the command C_MULTI produces effects on (in this case a control of) the turbomachine T.

FIG. 5 schematically represents a particular exemplary embodiment of the first determining module MOD_DET1 belonging to the control system SYS_C used for the operation of the control loop of FIG. 4.

In the example of FIG. 5, the first determining module MOD_DET1 includes different sub-modules, including:
 a first sub-module SS1_MOD_DET1 configured to receive as input the signals S_N1, S_N2, S_Wf and the rating setpoint N2_REQ, as well as to determine, based on these inputs, a desired rating variation dN2 of the HP shaft 22,
 a second sub-module SS2_MOD_DET1 configured to receive as input said desired variation dN2, as well as to determine, based on this input, a required total power command Udes,
 a third sub-module SS3_MOD_DET1 configured to receive as input the signals S_N1, S_N2, S_Wf, S_P1 and S_P2, as well as to determine (estimate), based on these inputs, the current control power Uactu delivered by the electric machines M1, M2. The term "current control power" refers to the overall power injected/taken off by the set of the two electric machines M1, M2 at the time when the control loop is implemented,
 a fourth sub-module SS4_MOD_DET1 configured to receive as input the command Udes and the current control power Uactu, as well as to determine, based on these inputs, the total mechanical power variation dU.

FIG. 6 schematically represents a particular exemplary embodiment of the second determining module MOD_DET2 belonging to the control system SYS_C used for the operation of the control loop of FIG. 4.

In the example of FIG. 6, the second determining module MOD_DET2 includes a sub-module SS_MOD_DET2 configured to receive as input the signals S_P1, S_P2 and the setpoint Pelec_REQ, as well as to determine, based on these inputs, the desired power injection/take-off for all the electric machines M1, M2. The determination of said variation dPelec is done in this example according to a feedforward control scheme.

It should be noted that the examples of FIGS. 5 and 6 correspond only to variant embodiments of said first and second determining modules MOD_DET1, MOD_DET2. Other variants may of course be envisioned, such as for example a determining module MOD_DET_1 also relying on a feedforward control scheme and/or a determining module MOD_DET_2 not using any feedforward. In general, those skilled in the art know the hardware and/or software means to be implemented to generate the variations dU and dPelec.

FIG. 7 schematically represents a particular exemplary embodiment of the third determining module MOD_DET3 belonging to the control system SYS_C used for the operation of the control loop of FIG. 4.

In the example of FIG. 7, the third determining module MOD_DET3 includes different sub-modules, including:

- a first sub-module SS1_MOD_DET3 configured to receive as input the signal S_Wf and the limits Wf_MULTI_MIN, Wf_MULTI_MAX, as well as to determine, based on these inputs, a maximum fuel variation dWf_MAX and a minimum fuel variation dWf_MIN,
- a second sub-module SS2_MOD_DET3 configured to receive as input the limits U1_MULTI_MIN, U1_MULTI_MIN, U2_MULTI_MAX, U2_MULTI_MIN, and current values U1_ACTU, U2_ACTU of the power injection/take-off components U1_MULTI, U2_MULTI for each electric machine M1, M2 (the term "current" refers to values applied before a new iteration of the control loop), as well as to determine, based on these inputs, a maximum injected/taken-off power variation dU1_MAX and a minimum injected/taken-off power variation dU1_MIN for the component U1_MULTI, as well as a maximum injected/taken-off power variation dU2_MAX and a minimum injected/taken-off power variation dU2_MIN for the component U2_MULTI,
- a third sub-module SS3_MOD_DET3 configured to receive as input a signal S_T25 (corresponding to a signal relating to a temperature T25, i.e. a temperature at the outlet of the LP compressor 11), as well as the signals S_N2, S_Pt3, S_Pt25, and to determine, based on these inputs, a maximum pressure ratio variation dπ_MAX and a minimum pressure ratio variation dπ_MIN (note that the third sub-module SS3_MOD_DET3 computes internally the limits π_MIN, π_MAX mentioned above, which are not constant parameters),
- a fourth sub-module SS4_MOD_DET3 configured to receive as input the signal S_T49, as well as to determine, based on these inputs, a maximum temperature variation dt_MAX MIN (note that the fourth sub-module SS4_MOD_DET3 computes internally the limit t_MAX mentioned above).

It should be noted that the different variations provided at the output of said first, second, third and fourth sub-modules are for example also determined such that the control of the turbomachine T is done by ensuring "smooth" saturations as well as desaturations in the event of an overshoot.

Moreover, in the example of FIG. 7, the third determining module MOD_DET3 also includes a fifth sub-module SS5_MOD_DET3 configured to receive as input:

- the variations dU and dPelec,
- the signals S_P1, S_P2,
- the signals S_N1, S_N2, as well as (measured) values of the input conditions of the turbomachine T in terms of temperature T0 and pressure P0, and also a value of the Mach M number,
- the variations dWf_MAX, dWf_MIN, dU1_MAX, dU1_MIN, dU2_MAX, dU2_MIN, dπ_MAX, dπ_MIN, dt_MAX, as well as to determine, based on these inputs, the variations dWf_MULTI, dU1_MULTI and dU2_MULTI for, respectively, each of the control variables considered here. Subsequently, and identically to that described above, the components Wf_MULTI, U1_MULTI and U2_MULTI are determined by integration of the corresponding variations dWf_MULTI, dU1_MULTI and dU2_MULTI.

As indicated above, the multivariable command C_MULTI is determined, in accordance with the invention, such as to optimize a constraint of tracking of the variations dU and dPelec, and to observe operating limits under consideration for the turbomachine T. Put still otherwise, the multivariable command C_MULTI can be seen as the solution to a constrained optimization problem.

According to an exemplary embodiment, said optimization problem is formulated such that the constraint of tracking of the variations dU and dPelec is written:

$$\begin{bmatrix} a & b & c \\ 0 & d & e \end{bmatrix} \begin{bmatrix} dWf\_MULTI \\ dU1\_MULTI \\ dU2\_MULTI \end{bmatrix} = \begin{bmatrix} dU \\ dPelec \end{bmatrix} + \begin{bmatrix} v1 \\ v2 \end{bmatrix}$$

The coefficients a, b, c, d and e are given coefficients. More specifically, these are coefficients expressing a choice of modeling of the variations dU, dU1_MULTI, dU2_MULTI, dWf_MULTI and dPelec. In this example, this choice of model is expressed according to the following formulae:

$$a \times dWf\_MULTI + b \times dU1\_MULTI + c \times dU2\_MULTI = dU$$

and $$d \times dU1\_MULTI + e \times dU2\_MULTI = dPelec$$

In other words, the coefficients a, b, c, d and e express the choice according to which the dependency between variations dU, dU1_MULTI, dU2_MULTI, dWf_MULTI and dPelec is locally linear (or else equivalently, piecewise linear).

Note that in practice these coefficients a, b, c, d and e are implemented in the form of interpolation maps (a function of N1, N2, P1, and P2). It is also possible to envision an online linearization of the model used.

Said coefficients a, b, c, d and e are obtained before the implementation of the control method according to the invention, for example following bench identification tests, or by exploiting pre-recorded flight data, or else by means of turbomachine modeling software.

In the same way, it is considered in this exemplary embodiment that the pressure ratio π and the temperature T49 have respective variations dπ and dT49 modelled linearly with respect to the variations dU1_MULTI, dU2_MULTI, dWf_MULTI, which can yet be written:

$$a\_\pi \times dWf\_MULTI + b\_\pi \times dU1\_MULTI + c\_\pi \times dU2\_MULTI = d\pi$$

and $$a\_t \times dWf\_MULTI + b\_t \times dU1\_MULTI + c\_t \times dU2\_MULTI = dT49$$

where the coefficients a_π, b_π, c_π and a_t, b_t, c_t are also given.

In addition, in the exemplary embodiment under consideration here, the optimization of the constraint of tracking of the variations dU and dPelec consists in minimizing a cost function J having the expression:

$$J = \begin{bmatrix} dWf\_MULTI \\ dU1\_MULTI \\ dU2\_MULTI \end{bmatrix}^T \times Q1 \times \begin{bmatrix} dWf\_MULTI \\ dU1\_MULTI \\ dU2\_MULTI \end{bmatrix} + \begin{bmatrix} v1 \\ v2 \end{bmatrix}^T \times Q2 \times \begin{bmatrix} v1 \\ v2 \end{bmatrix}$$

Note that the index "T" in the exponent of a vector/of a matrix corresponds, conventionally, to the transpose operator.

Finally, the constrained optimization problem considered in this exemplary embodiment includes an equality constraint given above by means of the matrix comprising the coefficients a, b, c, d and e, along with a plurality of inequalities, namely:

$$dWf\_MIN \leq dWf\_MULTI \leq dWf\_MAX$$

$$dU1\_MIN \leq dU1\_MULTI \leq dU1\_MAX$$

$$dU2\_MIN \leq dU2\_MULTI \leq dU2\_MAX$$

$$d\pi\_MIN \leq d\pi \leq d\pi\_MAX$$

$$dT49 \leq dt\_MAX$$

The matrix V of the equality constraint, the components of which are v1 and v2, corresponds to a regularization parameter making it possible to relax the constraint of tracking of the variations dU and dPelec. Put still otherwise, said matrix V makes it possible to dispense with the control objectives when their embodiment is no longer possible while observing inequality constraints given above.

As regards the cost function J, the matrices Q1 and Q2 correspond to given weight matrices.

More specifically, the matrix Q1 is a weight matrix which makes it possible to minimize the variations of the control variables, and which can for example be chosen such as to prefer the use of one control variable over another in the context of the control of the turbomachine T.

The matrix Q2, meanwhile, is a weight matrix which makes it possible to minimize the deviation from the control objectives, and which can for example be chosen such as to prefer the use of one control objective over another. By way of example without any limitation whatsoever, the matrix Q2 can be chosen such that the regulation of the engine rating is preferred during transient phases with regard to electrical power injections/take-offs.

In practice, the solving of optimization problems can be done in different ways. For example, it is possible to reformulate said optimization problem into a so-called "QP" (Quadratic Programming) problem. Following this approach QP, the following notations may be considered:

let $$X = \begin{bmatrix} dWf\_MULTI \\ dU1\_MULTI \\ dU2\_MULTI \\ v1 \\ v2 \end{bmatrix}$$

the vector of the variables to be determined,
let $$P = \begin{bmatrix} dU \\ dPelec \\ dWf\_MIN \\ dU1\_MIN \\ dU2\_MIN \\ d\pi\_MIN \\ dWf\_MAX \\ dU1\_MAX \\ dU2\_MAX \\ d\pi\_MAX \\ dt\_MAX \end{bmatrix}$$

the vector of the parameters taken into consideration.

Hence, the optimization problem can be written, in accordance with said QP approach, in the following form:

cost function to be minimized: $J = X^T \Phi X + X^T R\ P$ constraints: $A_1\ X = C_1 P$ and $A_2\ X \leq C_2 P$ where the matrices $\Phi$, R, $A_1$, $A_2$, $C_1$ and $C_2$ may be deduced as a function of $Q_1$, $Q_2$ and $$\begin{bmatrix} a & b & c \\ 0 & d & e \end{bmatrix}.$$

Here one finds an optimization problem convex along the vector X parameterized by the vector P, for which a global solution is guaranteed. The solving of this problem is known to those skilled in the art, and different techniques can be used, such as for example the active constraints method which consists in updating a set of active constraints by identifying directions of improvement during the search for the optimal solution.

It should be noted that, in general, the optimization problem addressing the determination of the command C_MULTI can be solved online in real time. If computer resources are limited, offline solving can of course be envisioned, the optimization problem then being transformed into an interpolation map with several variables.

FIG. 8 shows, in the form of a flow chart, a particular embodiment of the control method according to the invention, implemented by the control system SYS_C of FIG. 3.

The description of the mode of implementation of FIG. 8 is done under the same assumptions as those done in the context of the description of the example of operation of the control loop of FIG. 4. As a reminder, it is considered in no way limiting that the turbomachine T is in a transient operating phase, such that the variation dU is determined for the HP shaft 22.

As illustrated by FIG. 8, the control method first includes a step E10 of determining, for said HP shaft 22, the total mechanical power variation dU. This step E10 is implemented by the first determining module MOD_DET1.

The control method also includes a step E20 of determining, for the set of electric machines M1, M2, the power injection/take-off variation dPelec. This step E20 is implemented by the second determining module MOD_DET2.

Note that, in the mode of implementation of FIG. 8, the step E10 is executed before the step E20. However, nothing prevents the envisioning of other modes of implementation in which the step E20 is executed before the step E10, or else in which the steps E10 and E20 are executed in parallel.

The control method then includes a step E30 of determining the multivariable command C_MULTI. This step E30 is implemented by the third determining module MOD_DET3.

The components of the multivariable command C_MULTI can hence be transmitted to the actuators under consideration (electric machines M1 and M2, fuel system SYS_CARBU), such as to allow the control of the turbomachine T.

The steps E10, E20 and E30 are subsequently iterated such as to allow the control over time of the turbomachine T. The frequency with which said steps E10, E20 and E30 are iterated corresponds to the frequency of computation of the FADEC 20, for example a frequency between 50 Hz and 100 Hz.

The remainder of the description relates to another exemplary embodiment of the control system SYS_C. In its general principle, this other exemplary embodiment repeats the set of technical features described above, but also aims to provide the control system SYS_C with an additional functionality (via a fourth determining module described below) making it possible to ensure a tolerance in the face of any faults on the electrical lines (uncontrolled power injection/take-off variations, electrical network unable to satisfy the requirements defined by the commands U1 and U2, delay in the application of the commands U1 and U2 once the latter have been transmitted to the control module MOD_ELEC, etc.), or to poor coordination between the control of the fuel flow rate and the control of the electric machines M1, M2.

Note that, in said other embodiment, the turbomachine T allows for a general structural configuration in accordance with that described above with reference to FIG. 2. Also, the reference signs of FIG. 2 relating to the mechanical components of the turbomachine T are repeated below.

Moreover, for said other embodiment, it is considered that the set E_S of signals includes, for the control of the turbomachine T, the signals S_P1, S_P2, S_N1, S_N2 and S_Wf already described previously, but also a power variation signal S_dP1 (or a power variation signal S_dP2) injected/taken off the LP shaft 21 (or off the HP shaft 22 respectively).

FIG. 9 schematically represents a second example of a hardware architecture of the control system SYS_C belonging to the turbomachine T of FIG. 2.

In the example of FIG. 9, the control system SYS_C according to the invention possesses the hardware architecture of a computer, and includes, in particular, a processor 1_2, a random-access memory 2_2, a read-only memory 3_2 and a non-volatile memory 4_2. It also possesses communication means 5_2.

The read-only memory 3_2 of the control system SYS_C constitutes a recording medium in accordance with the invention, readable by the processor and on which is recorded a computer program PROG_2 in accordance with the invention, including instructions for executing the steps of the control method according to the invention. The program PROG_2 defines the functional modules of the control system SYS_C, which rely on or control the hardware modules 2_2 to 5_2 of said control system SYS_C mentioned previously, and which notably comprise:

the first, second and third determining modules MOD_DET1, MOD_DET2, MOD_DET3 described above, a fourth determining module MOD_DET4 configured to determine a single-variable command Wf_MONO of fuel flow rate as a function of the variation dU, operating limits of the turbomachine and current injection/take-off values for said set of electric machines (the current values here referring to the signals S_P1, S_P2, S_dP1, S_dP2).

Furthermore, in said second example of FIG. 9, the third and fourth modules MOD_DET3, MOD_DET4 (and therefore of necessity the control system SYS_C in its entirety) are configured such that the single fuel flow rate command intended to be executed for the control of the turbomachine T, from among said command Wf_MONO and the fuel flow rate component Wf_MULTI of the multivariable command C_MULTI, is said command Wf_MONO.

In other words, for the control of the turbomachine T, the execution of the command Wf_MONO takes priority over the execution of the fuel flow rate component Wf_MULTI of the multivariable command C_MULTI. Which also means that in this other embodiment of the turbomachine T, the fuel flow rate component Wf_MULTI becomes optional.

By way of non-limiting example, it can be envisioned that the fuel flow rate component Wf_MULTI is executed (i.e. is transmitted to the combustion chamber 13) only if the fourth module MOD_DET4 encounters a problem preventing it from generating the command Wf_MONO.

FIG. 10 schematically represents another particular example of operating of the control loop of the turbomachine T, such as implementation by means, in particular, of the control system SYS_C of FIG. 9.

As illustrated by FIG. 10, the set of technical features described above with reference to FIG. 4 are still applicable here in this other example of operation of the control loop. In particular, the first, second and third determining modules MOD_DET1, MOD_DET2, MOD_DET3 are for example respectively configured according to the exemplary embodiments of the FIGS. 5, 6 and 7.

Moreover, the control loop of FIG. 10 differs from that of FIG. 4 in that the control system SYS_C now also includes said fourth determining module MOD_DET4.

Also, in the example of FIG. 10, the fourth determining module MOD_DET4 receives as input, in particular, the variation dU, the signals S_P1, S_P2, S_dP1, S_dP2, S_N1, S_N2, S_Wf, S_Pt3, S_Pt25 and S_T49, and the limits Wf_MULTI_MIN, Wf_MULTI_MAX. Based on these signals and limits received as input, the fourth determining module MOD_DET4 is able to determine the single-variable command Wf_MONO.

The component Wf_MONO is then conveyed to the fuel system SYS_CARBU of the turbomachine T (instead and in place of the command Wf_MULTI which remains optional as mentioned above), such that the fuel flow rate injected into the combustion chamber 13 is in accordance with said command Wf_MONO.

FIG. 11 schematically represents a particular exemplary embodiment of the fourth determining module MOD_DET4 belonging to the control system SYS_C used for the operation of the control loop of FIG. 10.

For this example of FIG. 11, the notation is used according to which a reduced (also known as a "corrected") variable includes an index "r" by comparison with the non-reduced variable from which it comes.

The fact of "correcting" a variable (this can be a variable of a measured signal, as in the case of dP1 and dP2, or else a variable of a signal determined according to the invention, as in the case of the variation dU) results from an objective consisting in being able to compare with one another values of said variable which are not all acquired or determined under identical conditions. Put still otherwise, it is a question of dispensing with the ambient conditions in which such values are acquired or determined in order to make them comparable with one other. Under any circumstances, the reduction (correction) of variables is a technique well-known to those skilled in the art, who also know how to work back from a reduced variable to a non-reduced variable.

In the example of FIG. 11, the fourth determining module MOD_DET4 includes different sub-modules, including a first sub-module SS1_MOD_DET4 configured to receive as input the variation dU, the signals S_P1, S_P2, S_dP1, S_dP2, S_N1, S_N2, the values T0, P0 and M and the variations dWf_MAX, dWf_MIN, as well as to determine, based on these inputs, a variation dWf1 for the single fuel flow rate variable. For said first sub-module SS1_MOD_DET4, here it is a question of computing said variation dWf1 with a pre-compensation of the instantaneous variations in the electrical powers. For this purpose, it is considered in this example that the dependency between the variations dWf1_r, dU, dP1_r (i.e. reduced variation of the instantaneous power injected/taken off the LP shaft 21) and dP2_r (i.e. reduced variation of the instantaneous power injected/taken off the HP shaft 22) is locally linear, which can also be written:

$$a\_W \times dWf1\_r + b\_W \times dP1\_r + c\_W \times dP2\_r = dU\_r$$

where a_W, b_W and c_W are given coefficients.

The determination of the variation dWf1_r is deduced from the preceding expression, so as to finally obtain dWf1.

The fourth determining module MOD_DET4 also includes:
- a second sub-module SS2_MOD_DET4 similar to the first sub-module SS1_MOD_DET3 equipping the third determining module MOD_DET3 and described with reference to FIG. 7. The outputs of said second sub-module SS2_MOD_DET4 therefore correspond to a maximum fuel variation dWf2_MAX and a minimum fuel variation dWf2_MIN,
- a third sub-module SS3_MOD_DET4 similar, in terms of inputs, to the third sub-module SS3_MOD_DET3 equipping the third determining module MOD_DET3 and described with reference to FIG. 7. The outputs of said third sub-module SS3_MOD_DET4 here also correspond to a maximum fuel variation dWf3_MAX and a minimum fuel variation dWf3_MIN,
- a fourth sub-module SS4_MOD_DET4 similar, in terms of inputs, to the fourth sub-module SS4_MOD_DET3 equipping the third determining module MOD_DET3 and described with reference to FIG. 7. The outputs of said fourth sub-module SS4_MOD_DET4 here also correspond to a maximum fuel variation dWf4_MAX and a minimum fuel variation dWf4_MIN.

Moreover, in the example of FIG. 11, the fourth determining module MOD_DET4 also includes a fifth sub-module SS5_MOD_DET4 configured to receive as input the variations dWf1, dWf2_MAX, dWf2_MIN, dWf3_MAX, dWf3_MIN, dWf4_MAX, dWf4_MIN, as well as to determine, based on these inputs, a variation dWf_MONO for the single fuel flow rate variable. More specifically, the variation dWf_MONO is determined by taking into account the smallest of the variations from among dWf2_MIN, dWf3_MIN, dWf4_MIN as well as the largest of the variations dWf2_MAX, dWf3_MAX, dWf4_MAX.

As already explained above, the command Wf_MONO is determined by integrating the variation dWf_MONO. Note that, in the example of FIG. 11, it is also considered that:
- the dependency between the variations provided as input to the third sub-module SS3_MOD_DET4 is locally linear,
- the dependency between the variations provided as input to the fourth sub-module SS4_MOD_DET4 is locally linear.

FIG. 12 shows, in the form of a flow chart, a particular mode of implementation of the control method according to the invention, by the control system SYS_C of FIG. 9.

The description of the mode of implementation of FIG. 10 is given under the same assumptions as those made in the context of the description of the mode of implementation of FIG. 8.

In the mode of implementation illustrated by FIG. 10, the control method includes steps F10, F20 and F30 respectively identical to the steps E10, E20 and E30 described above with reference to the mode of implementation of FIG. 8.

The control method also includes a step F40 of determining the single-variable command Wf_MONO. This step F40 is implemented by the fourth determining module MOD_DET4.

Note that, in the mode of implementation illustrated by FIG. 10, the step F40 is executed in parallel to the step F30. Nothing however prevents the envisioning of other modes of implementation in which the step F40 is executed before or else after the step F30. Under any circumstances, whatever the order in which said steps F30 and F40 are executed, the command Wf_MONO takes priority over the component WF_MULTI of the command C_MULTI, as already mentioned above.

The steps F10, F20, F30 and F40 are subsequently iterated such as to allow the control over time of the turbomachine T. The frequency at which said steps F10, F20, F30 and F40 are iterated corresponds to the computing frequency of the FADEC 20, for example 50 Hz.

The invention has until now been described by considering modes of implementation in which the different signals of the set E_S are acquired prior to the execution of the control method. Nonetheless, these are only variant implementations of the invention, and nothing prevents the envisioning of modes in which the acquisition of the signals of the set E_S is part of the control method. Note that in this case, the control system according to the invention also includes an obtaining module configured to obtain said signals of the set E_S.

The invention claimed is:

1. A method for controlling a turbomachine equipped with a gas generator comprising, respectively, low-pressure and high-pressure, rotation shafts, the turbomachine including at least one electric machine forming a device for injecting/taking-off power onto/from at least one shaft of the rotation shafts, said method including steps included in a control loop and comprising:

determining, for the at least one shaft of the rotation shafts and as a function of a rating setpoint associated with said at least one shaft of the rotation shafts, of a variation dU of a mechanical power command, determining, for the at least one electric machine and as a function of an injection/take-off setpoint associated with said at least one electric machine, of a variation dPelec of a power injection/take-off command, determining of a multivariable command including a fuel flow rate component as well as a power injection/take-off component for each electric machine, said multivariable command being determined to:

optimize a constraint of tracking of said variations dU and dPelec, observe operating limits of the turbomachine.

2. The method as claimed in claim 1, wherein the steps included in the control loop further include a step of determining a single-variable fuel flow rate command as a function of said variation dU, operating limits of the turbomachine and current injection/take-off values for the at least one electric machine, the single-variable fuel flow rate command intended to be executed for the control of the turbomachine.

3. The method as claimed in claim 1, wherein the operating limits include:

a lower limit and an upper limit of a ratio of pressures at an outlet and at an inlet of a high-pressure compressor belonging to the gas generator, such as to provide protection from surge and flameout phenomena, and/or for at least one turbine belonging to the gas generator from among a low-pressure turbine and a high-pressure turbine, an upper temperature limit of the low-pressure turbine and the high-pressure turbine.

4. The method as claimed in claim 1, wherein the turbomachine includes a first electric machine of the at least one electric machine forming a device for injecting/taking-off power onto/from the low-pressure rotation shaft and a second electric machine of the at least one electric machine forming a device for injecting/taking-off power onto/from the high-pressure rotation shaft.

5. The method as claimed in claim 4, wherein the constraint of tracking of the variations dU and dPelec is written:

$$\begin{bmatrix} a & b & c \\ 0 & d & e \end{bmatrix} \begin{bmatrix} dWf\_MULTI \\ dU1\_MULTI \\ dU2\_MULTI \end{bmatrix} = \begin{bmatrix} dU \\ dPelec \end{bmatrix} + \begin{bmatrix} v1 \\ v2 \end{bmatrix}$$

where:

a, b, c, d and e are given coefficients, dWf_MULTI, dU1_MULTI and dU2_MULTI respectively correspond to bounded variations of the fuel flow rate component, of the power injection/take-off component for the first electric machine and of the power injection/take-off component for the second electric machine, a matrix V, of which components v1 and v2 are given, corresponds to a regularization parameter used to relax the constraint of tracking of the variations dU and dPelec, and in which the optimization of the tracking constraint consists in minimizing a cost function J having an expression:

$$J = \begin{bmatrix} dWf\_MULTI \\ dU1\_MULTI \\ dU2\_MULTI \end{bmatrix}^T \times Q1 \times \begin{bmatrix} dWf\_MULTI \\ dU1\_MULTI \\ dU2\_MULTI \end{bmatrix} + \begin{bmatrix} v1 \\ v2 \end{bmatrix}^T \times Q2 \times \begin{bmatrix} v1 \\ v2 \end{bmatrix}$$

where Q1 and Q2 are given weight matrices.

6. The method as claimed in claim 1, wherein said at least one shaft of the rotation shafts considered when determining the variation dU is the low-pressure rotation shaft if the control loop is implemented during a steady-state operation phase of the turbomachine, and the high-pressure rotation shaft if the control loop is implemented during a transient operating phase of the turbomachine.

7. A system for controlling a turbomachine equipped with a gas generator comprising, respectively, low-pressure and high-pressure rotation shafts, the turbomachine including at least one electric machine forming a device for injecting/taking-off power onto/from at least one shaft of the rotation shafts, said control system including:

a first determining module configured to determine, for the at least one shaft of the rotation shafts and as a function of a rating setpoint) associated with said at least one shaft of the rotation shafts, a variation dU of a mechanical power command, a second determining module configured to determine, for the set of electric machines and as a function of an injection/take-off setpoint associated with the at least one electric machine, a variation dPelec of a power injection/take-off command, a third determining module configured to determine a multivariable command including a fuel flow rate component as well as a power injection/take-off component for each electric machine M1, M2, said multivariable command being determined to:

optimize a constraint of tracking of the variations dU and dPelec, observe operating limits of the turbomachine.

8. The system as claimed in claim 7, said system further including a fourth determining module configured to determine a single-variable fuel flow rate command as a function of said variation dU, operating limits of the turbomachine as well as injection/take-off values for said at least one electric machine, the single-variable fuel flow rate command intended to be executed for the control of the turbomachine.

9. An aircraft including the system as claimed in claim 7.

* * * * *